US012606264B2

(12) United States Patent
Schnee et al.

(10) Patent No.: US 12,606,264 B2
(45) Date of Patent: Apr. 21, 2026

(54) METHOD AND DEVICE FOR PLAUSIBILIZING A SENSOR SIGNAL OF A SINGLE-TRACK VEHICLE

(71) Applicant: Robert Bosch GmbH, Stuttgart (DE)

(72) Inventors: Jan Schnee, Weil Im Schoenbuch (DE); Jo Pletinckx, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 289 days.

(21) Appl. No.: 18/055,912

(22) Filed: Nov. 16, 2022

(65) Prior Publication Data

US 2023/0192219 A1 Jun. 22, 2023

(30) Foreign Application Priority Data

Dec. 17, 2021 (DE) ..................... 10 2021 214 598.1

(51) Int. Cl.
 *B62J 45/20* (2020.01)
 *B62J 45/40* (2020.01)
 (Continued)
(52) U.S. Cl.
 CPC .............. *B62J 45/20* (2020.02); *B62J 45/40* (2020.02); *B62J 50/22* (2020.02); *B62M 6/50* (2013.01); *G01M 13/021* (2013.01)
(58) Field of Classification Search
 CPC . B62J 45/20; B62J 45/40; B62J 45/412; B62J 50/22; B62M 6/50; G01M 13/021; G01P 3/44; G01P 21/02
 See application file for complete search history.

(56) References Cited

U.S. PATENT DOCUMENTS

| | | | | |
|---|---|---|---|---|
| 10,989,730 B2* | 4/2021 | Corno | ..................... | G01P 21/02 |
| 2004/0158372 A1* | 8/2004 | Schwertfuehrer | ...... | G01P 3/481 |
| | | | | 701/31.7 |

(Continued)

FOREIGN PATENT DOCUMENTS

| | | |
|---|---|---|
| DE | 102014212760 A1 | 3/2015 |
| DE | 102014214085 A1 | 1/2016 |

(Continued)

OTHER PUBLICATIONS

English Machine Translation of EP 2977648 A2, accessed Nov. 6, 2024.*

(Continued)

*Primary Examiner* — Thomas E Worden
*Assistant Examiner* — Blake A Wood
(74) *Attorney, Agent, or Firm* — NORTON ROSE FULBRIGHT US LLP

(57) ABSTRACT

A method for plausibilizing a sensor signal of a single-track vehicle. The method includes: estimating gear ratios between a wheel speed of a wheel and a pedaling frequency of a pedal of a pedal unit and/or a drive speed of a drive of the single-track vehicle at multiple points in time; ascertaining a value of a reliability indicator based on the estimated gear ratios, the value of the reliability indicator being ascertained with the aid of a statistical parameter, in particular a variance, of the estimated gear ratios and/or a histogram of the estimated gear ratios; and plausibilizing the sensor signal based on a comparison of the value of the reliability indicator with a threshold value, the threshold value corresponding to a maximally permissible value of the reliability indicator.

14 Claims, 2 Drawing Sheets

(51) Int. Cl.
    *B62J 50/22*         (2020.01)
    *B62M 6/50*         (2010.01)
    *G01M 13/021*     (2019.01)

(56)               References Cited

U.S. PATENT DOCUMENTS

| | | | |
|---|---|---|---|
| 2017/0297199 A1* | 10/2017 | Suzuki | G01M 13/021 |
| 2021/0155314 A1* | 5/2021 | Nakamura | B62J 45/412 |
| 2022/0097799 A1* | 3/2022 | Eda | B62J 45/412 |

FOREIGN PATENT DOCUMENTS

| | | | |
|---|---|---|---|
| DE | 112017007870 T5 | 5/2020 | |
| DE | 102019203816 A1 | 9/2020 | |
| DE | 102019115312 B3 | 11/2020 | |
| EP | 2977648 A2 * | 1/2016 | ........... B62M 25/08 |

OTHER PUBLICATIONS

English Machine Translation of DE102019115312B3, accessed Nov. 6, 2024.*

\* cited by examiner

METHOD AND DEVICE FOR PLAUSIBILIZING A SENSOR SIGNAL OF A SINGLE-TRACK VEHICLE

CROSS REFERENCE

The present application claims the benefit under 35 U.S.C. § 119 of German Patent Application No. DE 10 2021 214 598.1 filed on Dec. 17, 2021, which is expressly incorporated herein by reference in its entirety.

FIELD

The present invention relates to a method for plausibilizing a sensor signal of a single-track vehicle, in particular an electric bicycle, a pedelec or the like.

In addition, the present invention pertains to a plausibilization device, which is designed to ascertain the reliability of a sensor signal of a single-track vehicle, in particular an electric bicycle, a pedelec or a similar vehicle.

The present invention also relates to a system made up of a single-track vehicle, in particular an electric bicycle, a pedelec or the like, and a plausibilization device.

Although the present invention is generally applicable to any single-track vehicle, the present invention will be described with regard to bicycles in the form of electric bicycles or pedelecs.

BACKGROUND INFORMATION

With the aid of a drive unit having a motor, electric bicycles make it possible to offer driving support to a rider. The respective drive unit not only includes the respective drive motor but also sensor equipment, for instance for ascertaining the driving speed of the electric bicycle. The driving support is modified as a function of the driving speed of the electric bicycle. Above a maximum speed of the electric bicycle, the driving support then no longer supplies a supplementary drive torque.

Due to malfunctions of the sensor equipment, it may happen that a sensor for the driving speed measures a speed that is too low, and the driving support thus remains activated beyond the maximum speed.

SUMMARY

In one example embodiment, the present invention provides a method for plausibilizing a sensor signal of a single-track vehicle, the method including the following steps:

estimating gear ratios between a wheel speed of a wheel and a pedaling frequency of a pedal of a pedal unit and/or a drive speed of a drive of the single-track vehicle at multiple points in time, ascertaining a value of a reliability indicator based on the estimated gear ratios, the value of the reliability indicator being ascertained with the aid of a statistical parameter, in particular a variance, of the estimated gear ratios and/or a histogram of the estimated gear ratios, plausibilizing the sensor signal by comparing the value of the reliability indicator with a threshold value, the threshold value corresponding to a maximally permissible value of the reliability indicator.

In one example embodiment, the present invention provides a plausibilization device, which is designed to ascertain the reliability of a sensor signal of a single-track vehicle and includes:

an estimation device, designed to estimate a gear ratio between a wheel speed and a pedaling frequency and/or a drive speed of the single-track vehicle at multiple points in time, an ascertainment device, designed to ascertain a value of a reliability indicator based on the estimated gear ratios, the value of the reliability indicator being ascertained with the aid of a statistical parameter, in particular a variance, of the estimated gear ratios, and/or a histogram of the estimated gear ratios, a plausibilization device, designed to plausibilize the sensor signal with the aid of the value of the reliability indicator and a threshold value, the threshold value corresponding to a maximally permissible value of the reliability indicator.

In one example embodiment, the present invention provides a system made up of a single-track vehicle and a plausibilization device.

When pedaling takes place during a ride, the gear ratio, that is, the ratio between the pedaling/drive speed and the wheel speed, may be approximately constant. The gear ratio is able to be estimated with the aid of the ratio of the values of a wheel speed sensor and a pedal/drive speed sensor according to embodiments of the present invention. If a sensor supplies incorrect values because of malfunctions, then the estimated gear ratio is particularly no longer constant but may have a high value of a statistical parameter, in particular a high variance, across the ride. A high variance of the estimated gear ratios may thus be an indicator of a faulty sensor, for example.

According to example embodiments of the present invention, the estimated gear ratios may also be transferred to a histogram. If no malfunctions of the sensor are present, then a thinly populated histogram results (thin lines in the histogram which correspond to the gear ratios of the different gears). "Smudging" of the lines, on the other hand, is an indicator that the sensor supplies incorrect values. The histogram has the advantage that even slow changes in the estimated gear ratios are able to be identified. If the estimated gear ratios change only slowly, their statistical parameter, in particular their variance, is low so that the value of the reliability indicator may possibly not reach the threshold value, whereas "smudging" of the lines in the histogram can be detected even if slow changes are present.

One of the thereby achieved advantages is that it is easily possible to ascertain the reliability of a sensor signal, and malfunctions of a sensor can be detected as a result. Another advantage is that the plausibilization is able to be carried out without a redundant sensor. The present method may thus be implemented in a simple and cost-effective manner.

Further features, advantages and additional embodiments of the present invention are described in or disclosed by the following text.

According to one advantageous further refinement of the present invention, the estimating of the gear ratios is suspended for as long as a change in the gear ratio occurs and/or for as long as a drop below a minimum torque takes place on a drive side of the single-track vehicle. During the gear ratio change and/or for as long as no torque is applied to the drive side of the single-track vehicle, the bicycle thus is in a free-wheeling state, in particular, the gear ratios may have a high value of a statistical parameter, in particular a large variance, and a faulty value of the reliability indicator could be ascertained. By suspending the estimation, the correctness of the reliability indicator is able to be ensured. The change in the gear ratio may be detected via an abrupt change in the motor speed, for instance. In addition or as an alternative, the estimation may also be suspended when a drop below a minimum speed and/or a minimum pedaling frequency of the drive is/are encountered. It is also possible that the estimation will be suspended for a predefined period of time if a change in the torque and/or a drop below the minimum torque, the minimum speed, and/or a minimum pedaling frequency is/are detected.

According to a further advantageous refinement of the present invention, the value of the reliability indicator is ascertained with the aid of the statistical parameter, in particular the variance, of estimated gear ratios that were ascertained since the most recent change in the gear ratio. This has the advantage that the correctness or accuracy of the reliability indicator is able to be increased because the estimations of the gear ratio have an inherently large variance in the presence of multiple rapid changes in the gear ratio.

According to a further advantageous refinement of the present invention, the value of the reliability indicator is ascertained based on a number of at least 3 and maximally 50 most recently estimated gear ratios, in particular at least 5 and maximally 30 most recently estimated gear ratios, preferably at least 8 and maximally 20 most recently estimated gear ratios. This offers the advantage that the value of the reliability indicator is based on a number of values that is sufficient to allow for a plausibilization of the sensor signal and to ascertain the value of the reliability indicator with sufficient speed at the same time.

According to a further advantageous refinement of the present invention, the number of estimated gear ratios is specified with the aid of the value of the reliability indicator. If the value of the reliability indicator is low, i.e., the probability of malfunctions is low, the used number of the estimated gear ratios is able to be reduced. This makes it possible to perform the plausibilization more efficiently.

According to a further advantageous refinement of the present invention, an information signal is generated to inform a user of a threshold value exceedance, and/or a drive output is reduced if the value of the reliability indicator exceeds the threshold value. For example, the information signal may be a report that the vehicle must be checked at a service facility. This makes it possible to ensure that a user is aware that a malfunction has occurred and the single-track vehicle has to be checked. In addition, it is also ensured that the drive unit does not accelerate the single-track vehicle beyond the maximum speed.

According to another advantageous refinement of the present invention, the value of the reliability indicator is ascertained based on a peak detection algorithm and/or a derivation of at least a first order of a function which describes the values of the estimated gear ratios. In the event of malfunctions of the sensors, abrupt changes in the estimated gear ratios may occur at some point in time although no simultaneous change in the gear ratio took place. These abrupt changes may therefore also be used as a reliability indicator. Such abrupt changes can be detected quite easily with the aid of a peak detection algorithm, e.g., a CFAR. As an alternative or in addition, a function that describes the gear ratios, e.g., with the aid of a Savitzky-Golay filter, is able to be determined, and the derivation can be determined by this function. Values of the derivation that exhibit high amounts are also indicators of abrupt changes and may therefore be utilized to ascertain the value of the reliability indicator. This offers the advantage of allowing for an uncomplicated ascertainment of the value of the reliability indicator.

According to a further advantageous refinement of the present invention, the value of the reliability indicator ascertained with the aid of the histogram corresponds to a width of one or more peak(s) in the histogram. For this purpose, the estimated gear ratios are sorted into predefined bins, for which up to 500 bins, for example, can be used in a range of the estimated gear ratios of 0.5 to 5. High values in the histogram come about if estimated gear ratios occur frequently in individual bins. If the sensors do not exhibit any malfunctions, a frequent occurrence of the particular gear ratios that correspond to the gear ratios of the gears is expected. Through vibrations, slip, and imprecise measurements, gear ratios whose value lies close to the gear ratios of the gears may also be estimated. This manifests itself in narrow yet high peaks in the histogram. A malfunction will cause a change in the estimated gear ratios so that they no longer correspond to the gear ratios of the gears but exhibit scattering instead. In the histogram, this is indicated by peaks which are broader than and not as high as peaks in a histogram produced when no malfunctions of the sensors are present. Thus, the width of the peaks is a reliability indicator for the sensor signal. A value of the reliability indicator is therefore able to be determined in an uncomplicated manner.

The width of the peaks may be determined in different ways. For example, the individual peaks are first identified with the aid of a peak detection algorithm, in particular a CFAR, the peaks corresponding to driven gear ratios in a fault-free state of the sensor. The width of this peak is determined by forming the difference of the smallest and the greatest estimated gear ratio that lie within a continuous value range, each value within the value range having been estimated at least once, in particular. The difference therefore corresponds to the maximum width of a peak. As an alternative, it is also possible to take only the particular gear ratios into account that were estimated more frequently than the limit value. The limit value, for example, may correspond to half the maximum value of a peak, e.g., a full width at half maximum. In this case, the threshold value starting from which the sensor signal is deemed unreliable may be 0.1, in particular 0.05, and preferably 0.03. Of the considered estimated gear ratios, the difference between the greatest and the smallest value within a range is formed as well. In this way, outliers that occur only once will not be taken into account. If all the estimated gear ratios lie within a single value range so that only one peak exists, the difference may directly be used as a reliability indicator. On the other hand, if the estimated gear ratios lie in multiple value ranges, for instance because a gear change took place during the ride and multiple differences were therefore calculated, the average or the maximum value of the differences may be used as the reliability indicator.

According to a further advantageous refinement of the present invention, the sensor signal is a speed signal, a drive speed signal, a pedaling frequency signal, and/or a wheel speed signal. This offers the advantage that different sensor signals are able to be plausibilized. A signal may be plausibilized in that another signal is assumed to be known and correct in each case. For instance, the pedaling frequency may be used to plausibilize the wheel speed of a wheel, from which the speed of the single-track vehicle is inferable. However, it is also possible to plausibilize the drive speed using the speed as a starting point. For this purpose, the speed may be determined via a third source, e.g., a GPS acquisition.

According to a further advantageous refinement of the present invention, the value of the reliability indicator is ascertained based on a relative difference between the estimated gear ratio and a gear ratio supplied by the single-track vehicle, the gear ratio supplied by the single-track vehicle being continuously variable. The gear ratio supplied by the single-track vehicle can be supplied with the aid of a wired or radio interface, for example, and is able to be ascertained from a current stage of a rear derailleur. This offers the advantage that the method can also be used in single-track vehicles having a continuous gear ratio, i.e., without preset gears. In a continuous gear ratio, the estimated gear ratios thus also change continuously so that the value of the statistical parameters, especially their variance, is inherently high. However, because the actual and the estimated gear ratios are always identical in the ideal case, their difference is approximately zero and thus approximately constant. Significant deviations and/or a high variance of this difference is/are therefore a sign that a sensor transmits incorrect signals so that the value of the reliability indicator can be ascertained on that basis. It is also possible that the plausibilization is realized via the histogram.

According to a further advantageous refinement of the present invention, the value of the reliability indicator is based on a number of detected peaks. In the fault-free state of the sensors, the number of peaks maximally corresponds to the number of gears. If the number of peaks is greater than the number of gears, then this is an indicator that the sensor signal is unreliable. The provides the advantage that the reliability indicator can be determined in a straightforward manner.

Further features and advantages of the present invention result from the disclosure herein.

It is understood that the above-mentioned features and the features still to be described in the following text can be used not only in the individually indicated combination but also in other combinations or on their own without departing from the framework of the present invention.

Preferred implementations and embodiments of the present invention are illustrated in the figures and will be described in greater detail in the following description, in which identical reference numerals relate to the same or similar or functionally equivalent components or elements.

BRIEF DESCRIPTION OF THE DRAWINGS

Figure 1:
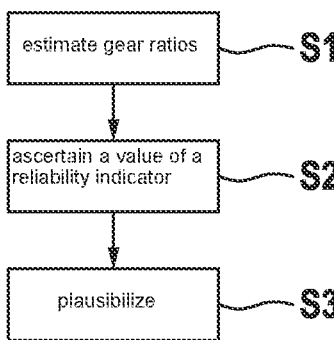
FIG. 1 shows, in schematic form, steps of a method according to an example embodiment of the present invention.

FIG. 1 shows steps of a method according to an example embodiment of the present invention in a schematic illustration.

In detail, FIG. 1 shows steps of a method for plausibilizing a sensor signal of a single-track vehicle, the method including the following steps:

Estimating S1 gear ratios between a wheel speed of a wheel and a pedaling frequency of a pedal of a pedal unit and/or a drive speed of a drive of the single-track vehicle at multiple points in time, ascertaining S2 a value of a reliability indicator based on the estimated gear ratios, the value of the reliability indicator being ascertained with the aid of a statistical parameter, in particular a variance, of the estimated gear ratios and/or a histogram of the estimated gear ratios, plausibilizing S3 the sensor signal by comparing the value of the reliability indicator with a threshold value, the threshold value corresponding to a maximally permissible value of the reliability indicator.

In other words, in step S1, a gear ratio is estimated for a single-track vehicle as the ratio of a wheel speed, e.g., a speed of a rear wheel and a pedaling frequency of a pedal. In the case of a bicycle, for example, the pedaling frequency of a pedal of a drive via a chain has a fixed relationship with the rotational speed of a rear wheel. As long as the rear wheel is not in a freewheeling state, the estimated gear ratio is therefore approximately constant. This gear ratio is estimated at different points in time.

In other words, in step S2, a value of a reliability indicator is ascertained with the aid of the estimated gear ratios. As long as the bicycle is in a fixed gear, the actual gear ratio between the drive and rear wheel remains constant and the estimated gear ratio must therefore remain constant as well, with the exception of minor measuring inaccuracies. This means that the value of the statistical parameter, in particular the variance, of the estimated gear ratios is small as long as the sensors required for estimating the gear ratio operate without a fault. However, if a sensor were to supply incorrect values because of malfunctions, the estimated gear ratio would no longer be constant but would fluctuate across a ride. This manifests itself in an increased value of the value of the statistical parameter, in particular an increased variance, in comparison with a fault-free state. The value of the statistical parameter of the gear ratio therefore provides information about the reliability of the sensor signal and may be used as the basis for the value of the reliability indicator.

As an alternative or in addition, the estimated gear ratios may be plotted in a histogram in step S2. A bicycle has a fixed number of gears and thus a fixed number of possible gear ratios. Thus, if the gear ratios estimated during the ride are plotted in a histogram, then only gear ratios that correspond to the gear ratios of the individual gears would have to be estimated in a fault-free state. In the histogram, this manifests itself in that a line is created for each gear that corresponds to the gear ratio of the gear. Because of measuring inaccuracies and vibrations, the actually estimated gear ratios may fluctuate around the ideal values so that peaks result in the histogram in reality. The width of these peaks is narrow in a fault-free state, that is, the width of the peaks is small in comparison with the spacings of the peaks among one another. However, if the estimated gear ratios are no longer constant due to faulty functions of a sensor, then this manifests itself in that the peaks in the histogram become broader and—in the extreme case—get smudged. It is therefore also possible to detect the reliability of the sensor signal based on the width of the peaks so that the width of the peaks in the histogram also serve as a basis for the value of the reliability indicator. This is made even clearer in FIGS. 2 through 4.

In other words, in step S3, the sensor signal is plausibilized by comparing the value of the reliability indicator with a threshold value. The threshold value particularly corresponds to a specified limit value starting from which the sensor signal is classified as unreliable. For example, the threshold value may be determined empirically. If the value of the reliability indicator is greater than the threshold value or in other words, the value of the statistical parameter, in particular the variance, of the estimated gear ratios is too high, then the sensor signal is deemed unreliable, and a drive support of the bicycle may be switched off or reduced.

Figure 2:
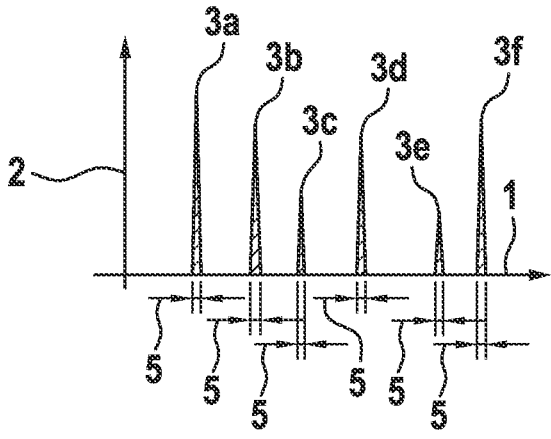
FIG. 2 shows, in schematic form, a first histogram according to a further example embodiment of the present invention.

FIG. 2 schematically shows a first histogram according to an embodiment of the present invention.

FIG. 2 is a detailed view of a histogram, which may be obtained when carrying out the method illustrated in FIG. 1. The histogram according to FIG. 2 shows the fault-free state of the bicycle. Abscissa 1 corresponds to the estimated gear ratios, and ordinate 2 corresponds to the frequency of the estimated gear ratios. Six peaks 3a-f can be seen in the histogram, and width 5 of the peaks is low in each case. This is an indicator that the sensor is functioning properly because only a few defined gear ratios were estimated, which correspond to the gears of the bicycle.

Figure 3:
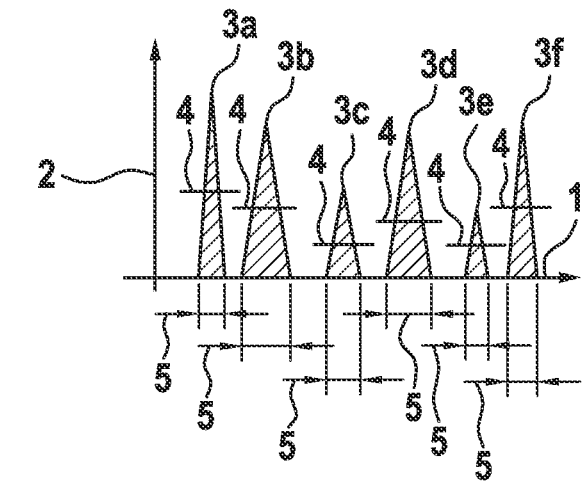
FIG. 3 shows, in schematic form, a second histogram according to a further example embodiment of the present invention.

FIG. 3 schematically shows a second histogram according to an embodiment of the present invention.

In comparison with FIG. 2, FIG. 3 schematically shows a second histogram according to an embodiment of the present invention, in which width 5 of peaks 3a-f is high rather than low. This means that the estimated gear ratios do not always correspond to the real gear ratios of the gears but to gear ratios that are not realistically realizable in the bicycle. This is an indicator that the sensor signal may be unreliable or faulty. The sensor signal becomes progressively more unreliable the broader and more smudged the peaks 3a-f. Width 5 of peaks 3a-f may be measured on abscissa 1 or at half the height 4 of the peaks, for example, so that individual outliers can be avoided.

Figure 4:
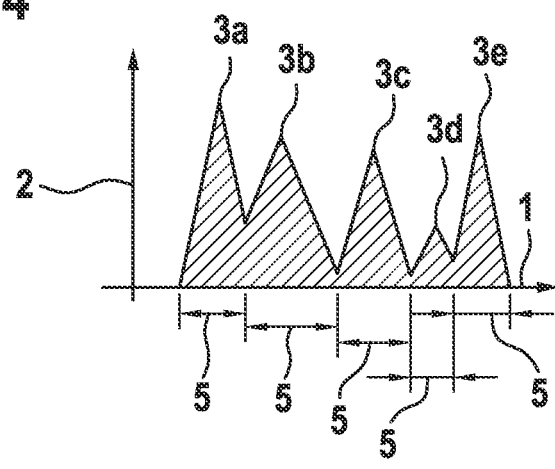
FIG. 4 shows, in schematic form, a third histogram according to an example embodiment of the present invention.

FIG. 4 schematically shows a third histogram according to an embodiment of the present invention.

FIG. 4 finally schematically shows a third histogram according to an embodiment of the present invention, in which peaks 3a-f "run into one another" and no longer form individual, separate regions. A multitude of different gear ratios were therefore estimated. This implies that the sensor signal is very unreliable, and the sensor is most likely faulty.

In summary, at least one embodiment of the present invention has at least one of the following features and/or provides at least one of the following advantages:

Plausibilizing a sensor signal in an uncomplicated manner
detecting malfunctions of a sensor
plausibilizing without a redundant sensor
the possibility of plausibilizing different sensor signals
simple and cost-effective implementation.

Although the present invention was described with the aid of preferred exemplary embodiments, it is not restricted to such but may be modified in a wide variety of ways.

What is claimed is:

1. A method for plausibilizing a sensor signal of a single-track vehicle, the method comprising the following steps:

estimating gear ratios of the single-track vehicle at multiple points in time between a wheel speed of a wheel and: (i) a pedaling frequency of a pedal of a pedal unit and/or (ii) a drive speed of a drive;

ascertaining a value of a reliability indicator based on the estimated gear ratios, the value of the reliability indicator being ascertained using a statistical parameter including a variance of the estimated gear ratios and/or a histogram of the estimated gear ratios; and plausibilizing the sensor signal by comparing the value of the reliability indicator with a threshold value, the threshold value corresponding to a maximally permissible value of the reliability indicator, wherein, in a fault-free state, the estimated gear ratio remains constant over time, and/or the histogram of the estimated gear ratios includes narrow peaks corresponding to actual gear ratios of the vehicle, and wherein a smudging or broadening of the peaks in the histogram indicates a malfunction of a sensor even when the variance remains below the threshold value.

2. The method as recited in claim 1, wherein the estimating of the gear ratios is suspended for as long as a change in the gear ratio occurs and/or for as long as a drop below a minimum torque occurs on a drive side of the single-track vehicle.

3. The method as recited in claim 1, wherein the value of the reliability indicator is ascertained based on a number of at least 3 and maximally 50 most recently estimated gear ratios.

4. The method as recited in claim 1, wherein the value of the reliability indicator is ascertained based on a number of at least 5 and maximally 30 most recently estimated gear ratios.

5. The method as recited in claim 1, wherein the value of the reliability indicator is ascertained based on a number of at least 8 and maximally 20 most recently estimated gear ratios.

6. The method as recited in claim 3, wherein the number of estimated gear ratios is specified using the value of the reliability indicator.

7. The method as recited in claim 1, wherein an information signal is generated to inform a user about a threshold value exceedance and/or a drive output is reduced, when the value of the reliability indicator exceeds the threshold value.

8. The method as recited in claim 1, wherein the value of the reliability indicator is ascertained based on a peak value detection algorithm and/or a derivation of at least a first order of a function that describes the values of the estimated gear ratios.

9. The method as recited in claim 1, wherein the value of the reliability indicator ascertained using the histogram corresponds to a width of one or more peaks in the histogram.

10. The method as recited in claim 1, wherein the sensor signal is a speed signal and/or a drive speed signal and/or a pedaling frequency signal and/or a wheel speed signal.

11. The method as recited in claim 1, wherein the value of the reliability indicator is ascertained based on a relative difference between the estimated gear ratio and a gear ratio supplied by the single-track vehicle, the gear ratio supplied by the single-track vehicle being continuously variable.

12. The method as recited in claim 1, wherein the value of the reliability indicator is based on a number of detected peaks.

13. A plausibilization device configured to ascertain a reliability of a sensor signal of a single-track vehicle, comprising a processor configured to:

estimate a gear ratio of the single-track vehicle at multiple points in time between a wheel speed and a pedaling frequency and/or a drive speed;

ascertain a value of a reliability indicator based on the estimated gear ratios, the value of the reliability indicator being ascertained using a statistical parameter including a variance of the estimated gear ratios and/or a histogram of the estimated gear ratios; and plausibilize the sensor signal using the value of the reliability indicator and a threshold value, the threshold value corresponding to a maximally permissible value of the reliability indicator, wherein, in a fault-free state, the estimated gear ratio remains constant over time, and/or the histogram of the estimated gear ratios includes narrow peaks corresponding to actual gear ratios of the vehicle, and wherein a smudging or broadening of the peaks in the histogram indicates a malfunction of a sensor even when the variance remains below the threshold value.

14. A system, comprising:

a single-track vehicle; and a plausibilization device configured to ascertain a reliability of a sensor signal of the single-track vehicle, including a processor configured to:

estimate a gear ratio of the single-track vehicle at multiple points in time between a wheel speed and a pedaling frequency and/or a drive speed, ascertain a value of a reliability indicator based on the estimated gear ratios, the value of the reliability indicator being ascertained using a statistical parameter including a variance of the estimated gear ratios and/or a histogram of the estimated gear ratios, and plausibilize the sensor signal using the value of the reliability indicator and a threshold value, the threshold value corresponding to a maximally permissible value of the reliability indicator, wherein, in a fault-free state, the estimated gear ratio remains constant over time, and/or the histogram of the estimated gear ratios includes narrow peaks corresponding to actual gear ratios of the vehicle, and wherein a smudging or broadening of the peaks in the histogram indicates a malfunction of a sensor even when the variance remains below the threshold value.

* * * * *